United States Patent [19]

Hirai

[11] Patent Number: 6,167,440

[45] Date of Patent: *Dec. 26, 2000

[54] COMMUNICATION STARTUP PROCESSING SYSTEM

[75] Inventor: Eiichi Hirai, Kawasaki, Japan

[73] Assignees: Fujitsu Limited; TerraNet Product Inc., both of Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/887,846

[22] Filed: Jul. 3, 1997

[30] Foreign Application Priority Data

Nov. 19, 1996 [JP] Japan .................................. 8-307605

[51] Int. Cl.[7] .................................................. G06F 15/16
[52] U.S. Cl. ................................. 709/217; 709/219
[58] Field of Search .................... 395/200.47, 200.49, 395/200.8, 200.59, 200.62, 200.55; 709/217, 219, 250, 229, 232, 225

[56] References Cited

U.S. PATENT DOCUMENTS

| | | | |
|---|---|---|---|
| 5,251,318 | 10/1993 | Nitta et al. ............................. | 395/725 |
| 5,442,771 | 8/1995 | Filepp et al. ........................... | 709/219 |
| 5,519,834 | 5/1996 | Kamerman et al. ................... | 709/217 |
| 5,586,257 | 12/1996 | Perlman ................................. | 463/42 |
| 5,598,536 | 1/1997 | Slaughter, III et al. ............... | 709/219 |
| 5,734,828 | 3/1998 | Pendse et al. ......................... | 709/219 |
| 5,764,639 | 6/1998 | Staples et al. ......................... | 709/217 |
| 5,881,231 | 3/1999 | Takagi et al. .......................... | 709/217 |

*Primary Examiner*—Zarni Maung
*Attorney, Agent, or Firm*—Staas & Halsey LLP

[57] ABSTRACT

A communication startup processing system has an introduction processor which, upon reception of a connection request from a user terminal through a communication path established via a network service provider using a public circuit, transfers destination information as to a user terminal to be connected to, to another user terminal. When information relative to a connection is transmitted from the other user terminal directly or through the introduction processor from the public circuit, a communication processor disconnects a circuit and starts a connection processor according control information included in the transmitted information, and connects again to a user terminal which has issued a connection request through the communication path based on the transmitted information. Since the communication processors of the user terminals make respective connections to the communication path for mutual communications between the user terminals, the expenses of the mutual communications are equalized between the user terminals.

15 Claims, 10 Drawing Sheets

COMMUNICATION STARTUP PROCESSING SYSTEM

BACKGROUND OF THE INVENTION

(1) Field of the Invention

The present invention relates to a communication startup processing system, and more particularly to a communication startup processing system for beginning communications between user terminals.

(2) Description of the Related Art

As computer networks, particularly, the Internet, find widespread usage, there have been demands for more complex and diverse modes of use for communications through computers at user terminals. One of those modes is a one-to-one mutual communication process for use in communication games in which users play a game through a communication circuit such as a public circuit.

There have heretofore been servers which provide services to introduce registered users to other registered users. Specifically, such a server is connected to a public circuit, and a user who desires mutual communications with other users accesses the server through the public circuit and is registered as a registered member. The server introduces registered members to those registered users who want mutual communications. To initiate a one-to-one mutual communication process between registered members, a registered user uses the computer at its own terminal to access the server and acquires information such as the telephone number of a registered member. Then, the user dials the acquired telephone number through the public circuit. When a connection to the registered member is established, they connect their computers to each other through the public circuit, and start mutual communications.

According to the above communication startup process, however, since the registered user connects to the other registered member directly through the public circuit, the registered user who is the calling party is required to bear all the expenses of the established connection through the public circuit. The fact that the calling party needs to bear all the expenses of the established connection though the connection has been made for the mutual communications between the registered members poses problems in that the expenses which the calling party has to pay become so large that the calling party suffers a large cost bearing imbalance especially if the involved registered members is spaced from each other by a large geographical distance.

SUMMARY OF THE INVENTION

It is therefore an object of the present invention to provide a communication startup processing system which is capable of equalizing the cost of communications between connected users or parties in mutual communications therebetween.

To achieve the above object, there is provided a communication startup processing system for starting mutual communications between at least two user terminals through a communication path established via a circuit relay apparatus using a public circuit, comprising connecting means at each of the user terminals for making a connection required for mutual communications with another user terminal to communicate with, communication processing means, connected between each of the user terminals and the public circuit and responsive to a control message from another user terminal, for starting the connecting means according to control information included in the control message, and connecting again to a user terminal which has issued a connection request through the communication path from the public circuit via the circuit relay apparatus, based on destination information included in the control message as to a user terminal to be connected to, and introduction processing means, connected to the public circuit and the communication path and responsive to a connection request from another user terminal through the communication path, for transmitting a control message including control information and destination information of the other user terminal, to the communication processing means of the user terminal indicated by the connection request.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Prior to describing preferred embodiments of the present invention, the principles of the present invention will first be described below with reference to FIG. 1.

Figure 1:
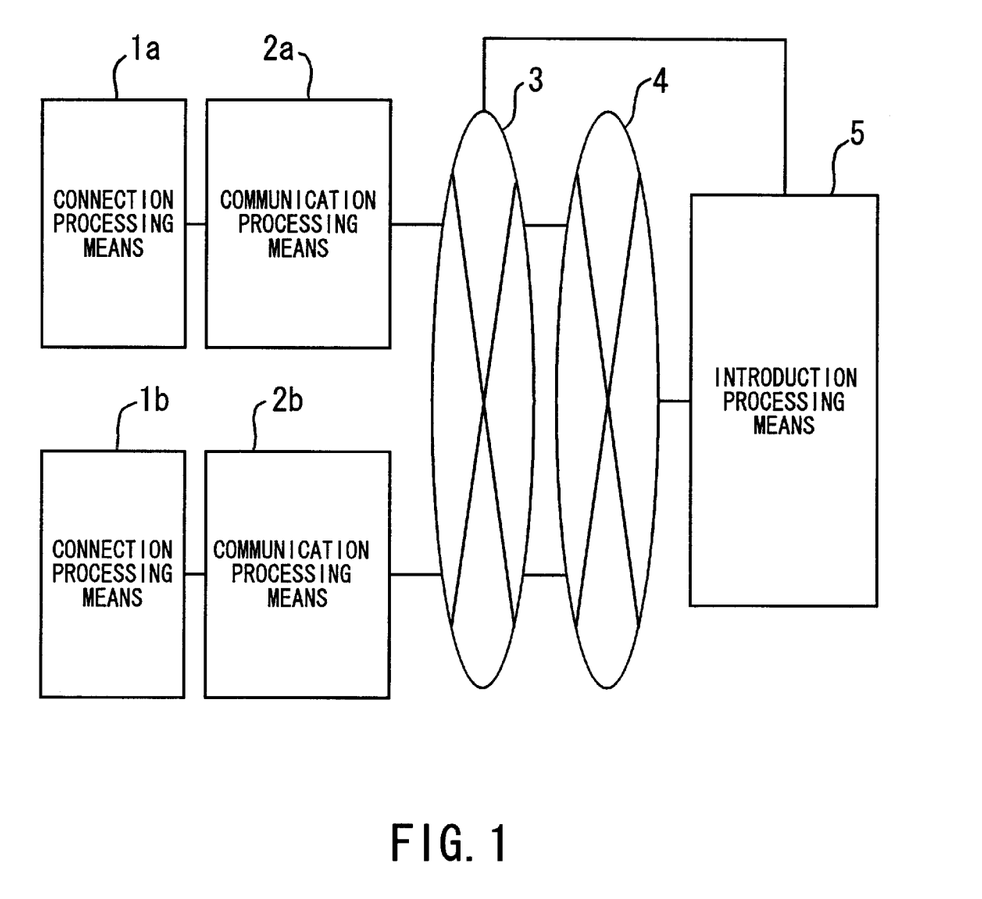
FIG. 1 is a block diagram illustrative of the principles of the present invention.

As shown in FIG. 1, a communication startup processing system according to the present invention generally comprises connecting means 1a, 1b for making connections required for mutual communications at respective user terminals, communication processing means 2a, 2b for connecting the user terminals to a public circuit 3, and an introduction processing means 5 connected to the public circuit 3 and a communication path 4 established from the public circuit 3 through a circuit relay apparatus, for introducing user terminals to make connections for mutual communications between the user terminals.

The public circuit 3 may be a circuit such as an analog or digital telephone circuit, a CATV circuit, or a satellite communication circuit, and indicates an accessible circuit for connection to the communication path 4 and a switching circuit capable of effect direct communications between the communication processing means 2a, 2b. The communication path 4 generally represents the Internet, and indicates another switching circuit connected to the public circuit 3 at an access point by a circuit relay apparatus called a network service provider.

The introduction processing means 5 generally represents a server on the Internet, and serves to introduce users when communications are to be started between the connecting means 1a, 1b. The connecting means 1a represents a user side for receiving incoming information indicative of another party to communicate with, from the introduction processing means 5, and indicates communication software for making a connection based on the acquired information indicative of another party to communicate with. The communication processing means 2a represents a device such as a modem or TA (Terminal Adapter) which is combined with the connecting means 1a for processing communications. The connecting means 1b represents a user side for transmitting a connection request to the introduction processing means 5, and transmits a connection request to carry out mutual communications with the connecting means 1a. The communication processing means 2b is combined with the connecting means 1b for processing communications, as with the communication processing means 2a.

In the communication startup processing system shown in FIG. 1, the connecting means 1b uses the communication processing means 2b and the public circuit 3 to transmit a connection request to the introduction processing means 5 through the communication path 4 via the circuit relay apparatus. The introduction processing means 5 dials the telephone number of the communication processing means 2a, which is contained in the information of the connection request, and transmits to the connecting means 1a connection information (including the telephone number of an access point, an IP address, and a port number) for connection to the connecting means 1b. The IP address of the connecting means 1b is acquired by the introduction processing means 5 at the time the connecting means 1b is connected to the introduction processing means 5. During this time, the connecting means 1b remains connected to the communication path 4, waiting for a connection from the connecting means 1a. Then, based on the connection information indicated by the introduction processing means 5, the connecting means 1a dials the telephone number of the access point to connect to the communication path 4 for thereby connecting itself to the connecting means 1b which has been connected to the communication path 4 and waited for a connection, making it possible to start communications.

The connecting means 1a, 1b are now connected to a nearby access point, which is provided by the network service provider, on the public circuit 3, and can carry out mutual communications on the Internet. After the connection information is indicated by the introduction processing means 5, the connecting means 1a connects again to the nearby access point on the public circuit 3, with the expenses of communications to be borne by the connecting means 1a, 1b to make certain that mutual communications are equalized.

An embodiment of the present invention which is applied to communication startup processing if a party to communicate with has been identified will be described below.

Figure 2:
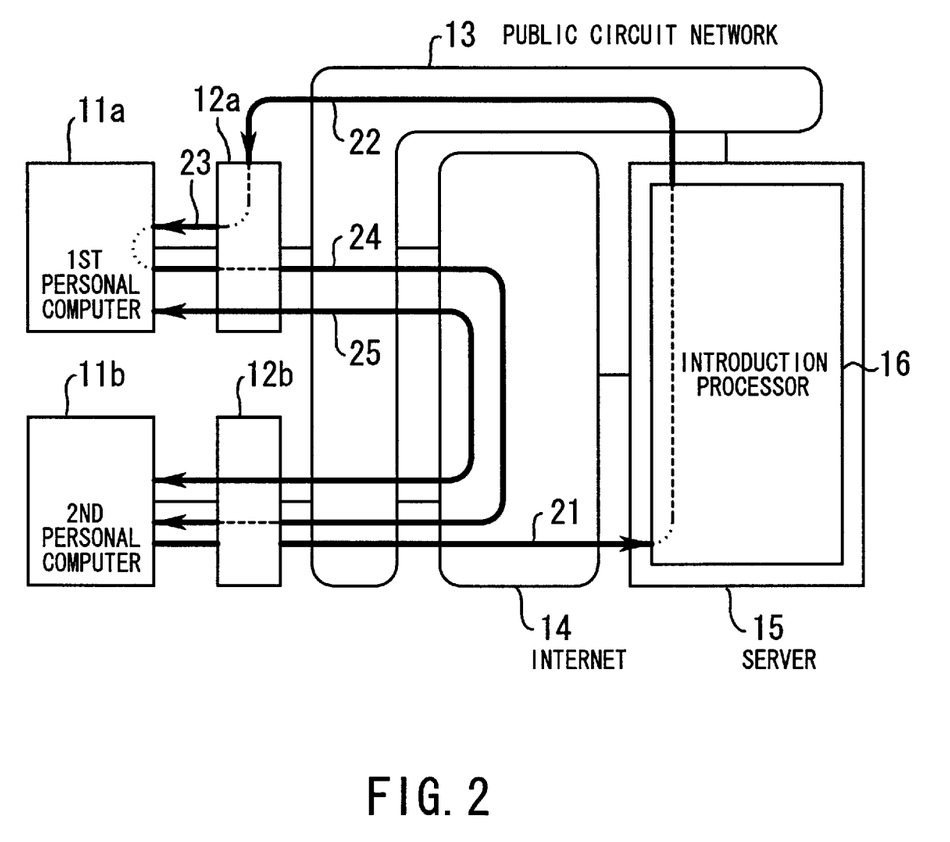
FIG. 2 is a block diagram showing an arrangement and an operation procedure of a communication startup processing system according to a first embodiment of the present invention.

FIG. 2 shows in block form an arrangement and an operation procedure of a communication startup processing system according to a first embodiment of the present invention. As shown in FIG. 2, a first personal computer 11a operated by a user is connected to a communication device 12a, and similarly a second personal computer 11b operated by another user is connected to a communication device 12b. The communication devices 12a, 12b are connected to a public circuit network 13, and can be connected to the Internet 14 through an access point provided by a network service provider. A server 15 is provided on the Internet 14. The server 15 has an introduction processor 16, and is directly connected to the public circuit network 13.

A communication startup process in which the first personal computer 11a as a party to communicate with has been identified and the second personal computer 11b issues a connection request, will briefly be described below.

The second personal computer 11b asks the introduction processor 16 of the server 15, as indicated by the arrow 21, to transmit the issuance of the connection request to the first personal computer 11a. The second personal computer 11b remains connected to the Internet 14 and waits, and its connection to the introduction processor 16 is finished. Then, the introduction processor 16 transmits information relative to a connection to the communication device 12a through the public circuit network 13 as indicated by the arrow 22. In response to the information, the communication device 12a starts a predetermined application in the first personal computer 11a, and transmits the information received from the introduction processor 16 to the application as indicated by the arrow 23. Based on the transmitted information, the application in the first personal computer 11a connects to the Internet 14, and connects to the second personal computer 11b that has waited, as indicated by the arrow 24. The first personal computer 11a and the second personal computer 11b are now capable of carrying out mutual communication as indicated by the arrow 25. The first personal computer 11a and the second personal computer 11b are connected to each other through the Internet 14, and equally bear the respective expenses for the connection up to the network service provider.

A communication startup process carried out after the second personal computer 11b issues a connection request and until mutual communications between the first and second personal computers 11a, 11b are started will be described in detail below.

Figure 3:
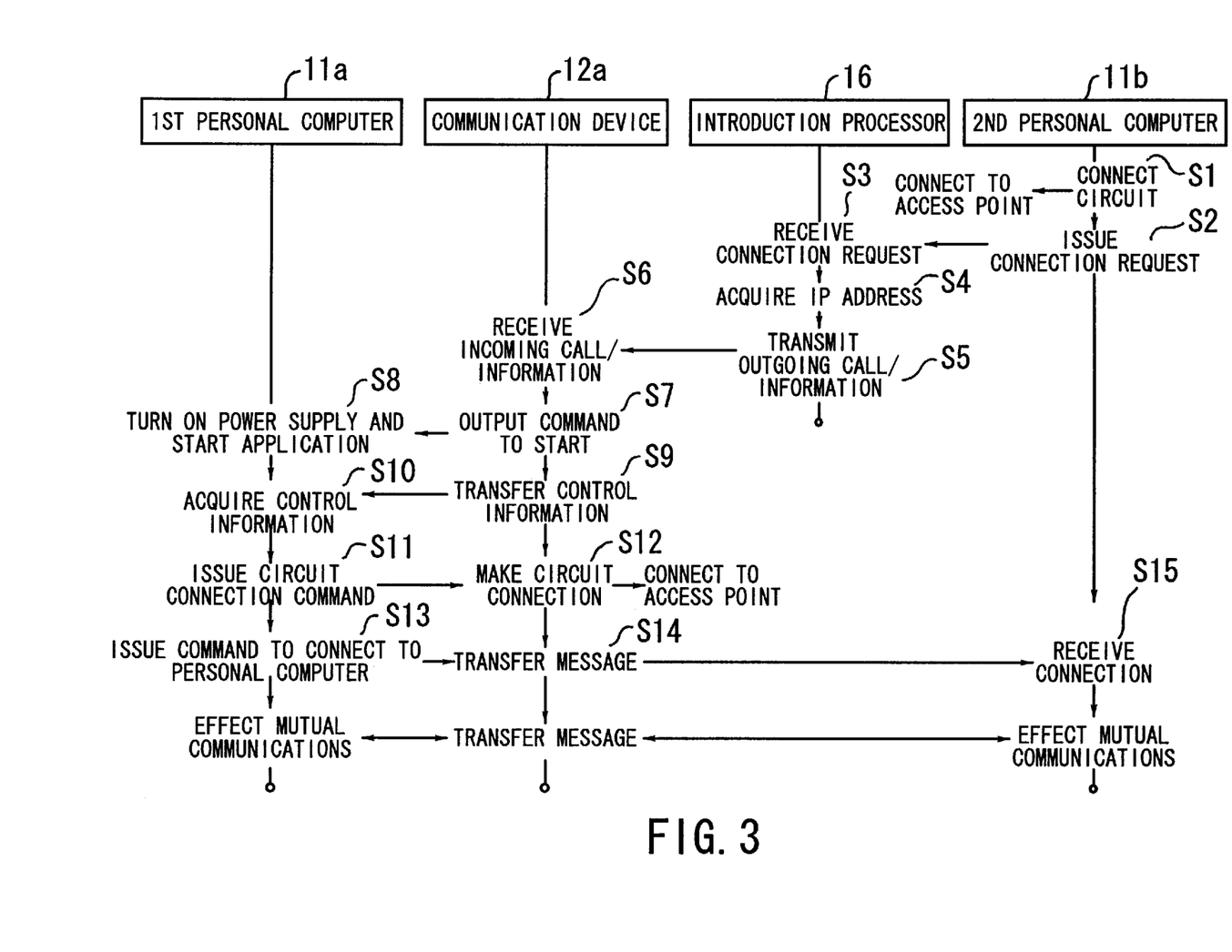
FIG. 3 is a flowchart of a processing sequence of the communication startup processing system according to the first embodiment.

FIG. 3 is a flowchart of a processing sequence of the communication startup processing system according to the first embodiment. As shown in FIG. 3, the second personal computer 11b effects circuit connection processing to connect to the server 15 in a step S1, thereby connecting to an access point on the Internet 14. Then, the second personal computer 11b issues a connection request to the first personal computer ha in a step S2. The connection request is received by the introduction processor 16 of the server 15 in a step S3. At this time, the connection request received by the introduction processor 16 includes a message relative to information (such as a telephone number) of a destination, i.e., a party to communicate with, of the first personal computer 11a, control information (such as the name of an application to be started by the first personal computer 11a and the names of parameters of the application) of the first personal computer 11a, and a port number of the second personal computer 11b, which is required when a connection to the second personal computer 11b is to be made. After having issued the connection request, the second personal computer 11b ends its connection to the introduction processor 16 of the server 15, remains connected to the Internet 14, and waits for a connection from the first personal computer 11a.

The introduction processor 16 of the server 15 acquires the IP address of the second personal computer 11b at the time it has been connected, in a step S4. Then, based on the information received from the second personal computer 11b, the introduction processor 16 dials the destination of the first personal computer 11a and transmits information to the destination in a step S5. At this time, the introduction processor 16 transmits the telephone number of the access point on the Internet, the IP address (or URL: Uniform Resource Locator) of the second personal computer 11b, the port number thereof, and the control information of the first personal computer 11a which has been received from the second personal computer 11b. The telephone number of an access point which is owned by the first personal computer 11a may be used as the telephone number of the access point on the Internet. In this case, the telephone number of the access point on the Internet may not be transmitted to the first personal computer 11a, or even if the telephone number of the access point on the Internet is transmitted to the first personal computer 11a, it may not be used by the first personal computer 11a.

The communication device 12a has been waiting for an incoming call from the introduction processor 16 of the server 15. When an incoming call arrives, the communication device 12a receives the information from the introduction processor 16 in a step S6. Then, based on the control information received from the introduction processor 16, the communication device 12a outputs a command to start an application to the first personal computer 11a in a step S7. In response to the command, the first personal computer 11a starts the application in a step S8. Then, the communication device 12a transfers the control information to the first personal computer 11a in a step S9. In response to the control information in a step S10, the first personal computer 11a transfers the IP address of the second personal computer 11b, the port number thereof, the telephone number of the access point, and other parameters to the application. Instead of starting the application in response to the command from the communication device 12a, the application may be active in the first personal computer 11a at all times.

Then, the first personal computer 11a issues a circuit connection command based on the transmitted telephone number of the access point of the second personal computer 11b in a step S11. In response to the circuit connection command, the communication device 12a makes a circuit connection to the access point on the Internet 14 in a step S12. Then, the first personal computer 11a issues a connection command for connection to the second personal computer 11b in a step S13. The communication device 12a transfers a message relative to the IP address of the second personal computer 11b and the port number thereof in a step S14. In response to the message, the second personal computer 11b receives a connection in a step S15. The first personal computer 11a and the second personal computer 11b are now connected to each other, and can effect mutual communications therebetween.

The communication device 12b connected to the second personal computer 11b only transfers a message, and is omitted from illustration in the flowchart shown in FIG. 3.

Another embodiment of the present invention which is applied to communication startup processing if a party to communicate with has been identified will be described below.

Figure 4:
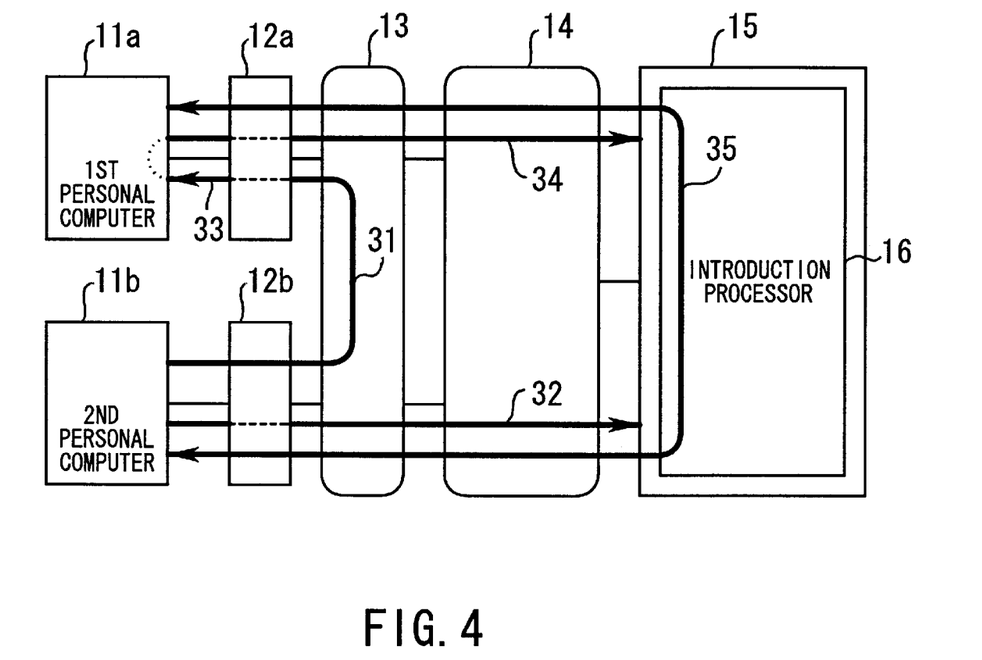
FIG. 4 is a block diagram showing an arrangement and an operation procedure of a communication startup processing system according to a second embodiment of the present invention.

FIG. 4 shows in block form an arrangement and an operation procedure of a communication startup processing system according to a second embodiment of the present invention. Those parts in FIG. 4 which are identical to those shown in FIG. 2 are indicated by identical reference numerals and representations and will not be described in detail below.

A communication startup process in which the first personal computer 11a as a party to communicate with has been identified and the second personal computer 11b issues a connection request will briefly be described below with reference to FIG. 4.

First, the second personal computer 11b transmits information relative to a connection to the communication device 12a connected to the first personal computer 11a directly through the public circuit network 13 as indicated by the arrow 31. Then, the second personal computer 11b transmits a desire to connect to the first personal computer 11a to the introduction processor 16 of the server 15, and waits for the first personal computer 11a to be connected to the introduction processor 16 as indicated by the arrow 32. Based on the information transmitted from the second personal computer 11b, the communication device 12a starts a predetermined application in the first personal computer 11a, and transmits the information received from the second personal computer 11b to the application as indicated by the arrow 33. Based on the indicated information, the first personal computer 11a connects to the Internet 14, and connects to the introduction processor 16 of the server 15 based on the information received from the communication device 12a, as indicated by the arrow 34. The first personal computer 11a and the second personal computer 11b are connected to each other through the introduction processor 16 for mutual communications therebetween as indicated by the arrow 35. In this arrangement, first personal computer 11a and the second personal computer 11b are connected to each other through the Internet 14, and equally bear the respective expenses for the connection up to the network service provider.

A communication startup process carried out after the second personal computer 11b issues a connection request and until mutual communications between the first and second personal computers 11a, 11b are started will be described in detail below.

Figure 5:
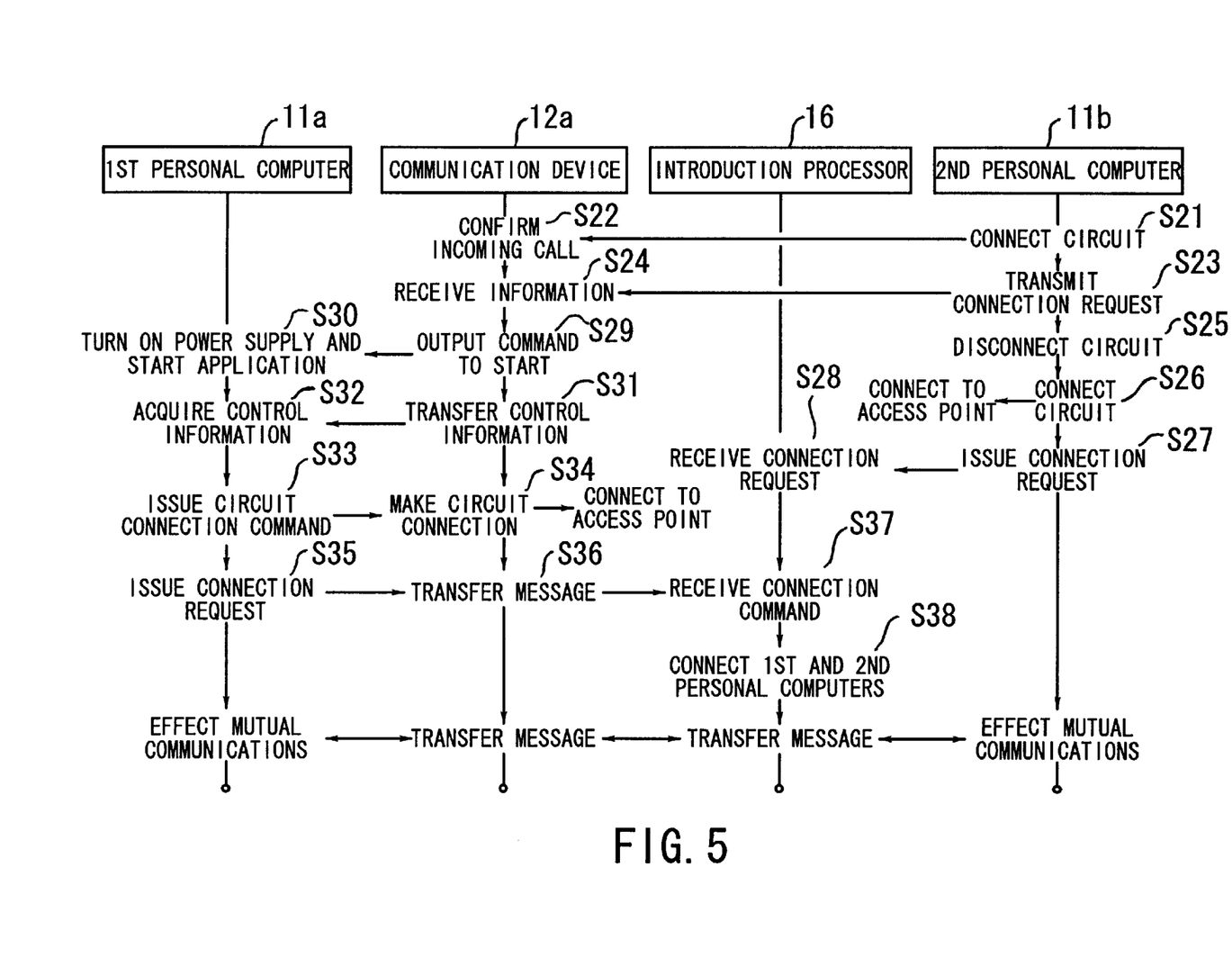
FIG. 5 is a flowchart of a processing sequence of the communication startup processing system according to the second embodiment.

FIG. 5 is a flowchart of a processing sequence of the communication startup processing system according to the second embodiment. As shown in FIG. 5, the second personal computer 11b effects circuit connection processing to connect directly to the communication device 12a in a step S21. After a call to the communication device 12a is confirmed in a step S22, the second personal computer 11b transmits connection request information in a step S23, and the communication device 12a receives the transmitted connection request information in a step S24. The connection request information contains the IP address (or the URL) of the server 15, the port number of the introduction processor 16, and the control information of the first personal computer 11a. At this time, the second personal computer 11b may simultaneously transmit the telephone number of the access point to the communication device 12a.

Then, the second personal computer 11b disconnects its circuit from the communication device 12a in a step S25, and makes a circuit connection to the access point of the server 15 on the Internet 14 in a step S26. The second personal computer 11b connects to the introduction processor 16 of the server 15, issues a connection request for connection to the first personal computer 11a, and waits until the first personal computer 11a is connected to the introduction processor 16 in a step S27. The introduction processor 16 receives a call from the second personal computer 11b, and, after it has received the call, receives the connection request from the second personal computer 11b for communications with the first personal computer 11a in a step S28.

Based on the control information received from the first personal computer 11b, the communication device 12a outputs a command to start an application to the first personal computer 11a in a step S29. In response to the command, the first personal computer 11a starts the application in a step S30. The communication device 12a may instead issue a command to turn on the power supply of the first personal computer 11a. Then, the communication device 12a transfers the control information to the first personal computer 11a in a step S31. The first personal computer 11a receives the control information in a step S32. The message of the control information contains the IP address of the server 15, the port number of the introduction processor 16, the telephone number of the access point, and other parameters, and is transferred to the application in the first personal computer 11a. Instead of starting the application in response to the command from the communication device 12a, the application may be active in the first personal computer 11a at all times.

Then, the first personal computer 11a issues a circuit connection command in a step S33. In response to the circuit connection command, the communication device 12a makes a circuit connection to the access point on the Internet 14 in a step S34. Then, the first personal computer 11a issues a connection command to the introduction processor 16 based on the IP address and the port number received from the communication device 12a in a step S35. In response to the connection command, the communication device 12a transfers the message and also information indicative of the desire to communicate with the second personal computer 11b to the introduction processor 16 in a step S36.

The introduction processor 16 has received the connection request from the second personal computer 11b in the step S28, and the second personal computer 11b remains connected to the introduction processor 16. Therefore, when there is a reply from the first personal computer 11a, the introduction processor 16 connects the first personal computer 11a and the second personal computer 11b to each other for mutual communications therebetween in a step S38. The mutual communications between the first personal computer 11a and the second personal computer 11b are carried out through the introduction processor 16. However, after the introduction processor 16 has transmitted IP addresses and port numbers of the first and second personal computers 11a, 11b to each other, mutual communications may be carried out directly between the first personal computer 11a and the second personal computer 11b.

Still another embodiment of the present invention which is applied to a communication startup process if a party to communicate with has not been identified will be described below.

Figure 6:
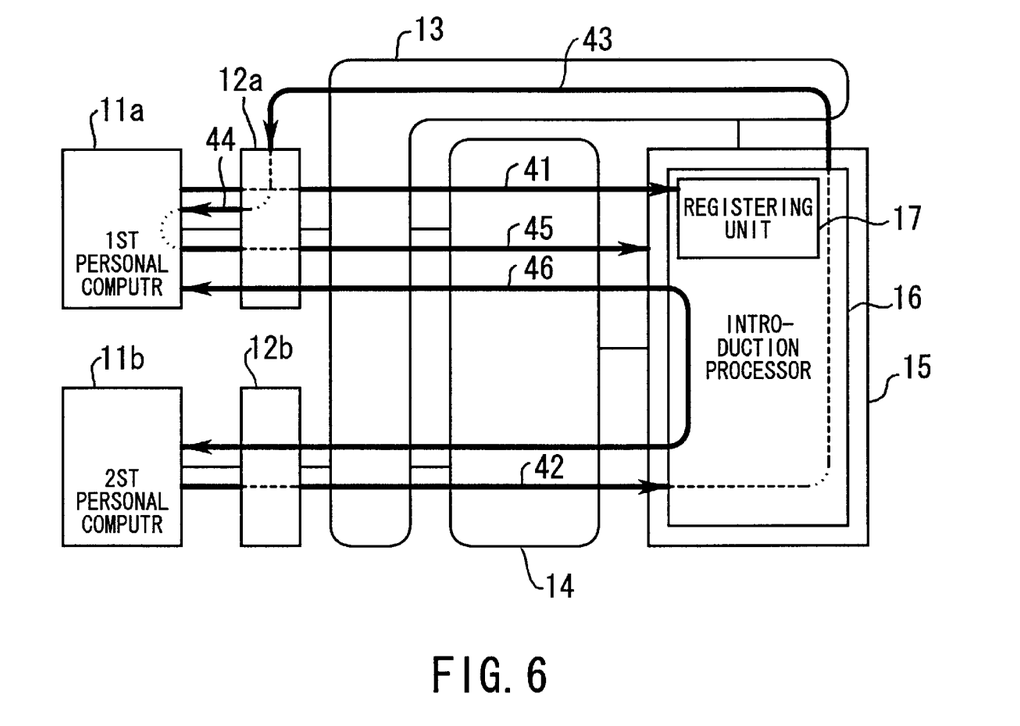
FIG. 6 is a block diagram showing an arrangement and an operation procedure of a communication startup processing system according to a third embodiment of the present invention.

FIG. 6 shows in block form an arrangement and an operation procedure of a communication startup processing system according to a third embodiment of the present invention. Those parts in FIG. 6 which are identical to those shown in FIG. 2 are indicated by identical reference numerals and representations and will not be described in detail below. As shown in FIG. 6, the introduction processor 16 of the server 15 in the communication startup processing system according to the third embodiment has a registering unit 17 for registering a connection request if there is no party to communicate with when a connection is requested.

A communication startup process carried out by the communication startup processing system according to the third embodiment is a process in which a personal computer as a party to communicate with has not been identified. In this process, a certain personal computer registers a connection request in the introduction processor 16 of the server 15, and a personal computer which sends a connection request after the registration is regarded as a party to communicate with. This communication startup process is useful for determining a party to compete with in a communication game. A communication startup process in which no party to communicate with is identified will briefly be described below with reference to FIG. 6. In this embodiment, it is assumed that the first personal computer 11a first issues a connection request, and then the second personal computer 11b issues a connection request.

First, the first personal computer 11a connects to the access point on the Internet and transmits a connection request to the introduction processor 16 of the server 15 as indicated by the arrow 41. Then, the first personal computer 11a disconnects its circuit from the access point. Then, the second personal computer 11b connects to the access point on the Internet and transmits a connection request to the introduction processor 16 of the server 15 as indicated by the arrow 42. At this time, the second personal computer 11b simultaneously transmits conditions for a party to communicate with. The second personal computer 11b remains connected to the Internet 14, and waits for a reply from a party to communicate with or the introduction processor 16. The introduction processor 16 searches the registering unit 17. If the first personal computer 11a meets the conditions which have been transmitted from the second personal computer 11b, then the introduction processor 16 transmits information indicative of the connection request from the second personal computer 11b to the first personal computer 11a through the public circuit network 13 as indicated by the arrow 43. Based on the information from the introduction processor 16, the communication device 12a starts a predetermined application in the first personal computer 11a, and transmits the information received from the second personal computer 11b to the application as indicated by the arrow 44. Based on the transmitted information from the introduction processor 16, the first personal computer 11a connects to the Internet 14, connecting again to the introduction processor 16 of the server 15 as indicated by the arrow 45. The first personal computer 11a and the second personal computer 11b are now connected to each other through the introduction processor 16 for mutual communication as indicated by the arrow 46. The first personal computer 11a and the second personal computer 11b are connected to each other through the Internet 14, and equally bear the respective expenses for the connection up to the network service provider.

A communication startup process carried out after the first personal computer 11a first issues a connection request, and then the second personal computer 11b issues a connection request and until the first personal computer 11a and the second personal computer 11b start mutual communications will be described in detail below.

Figure 7:
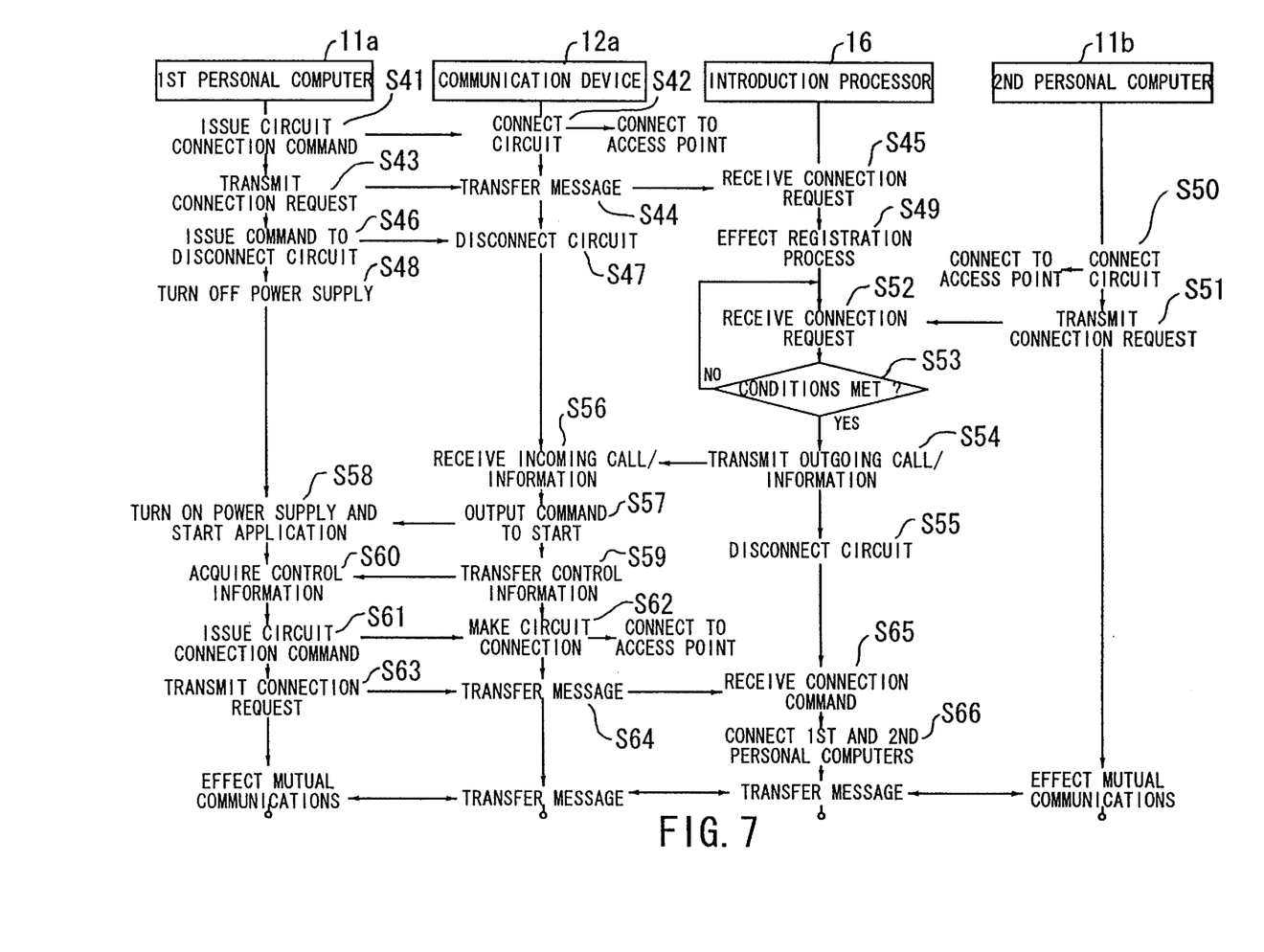
FIG. 7 is a flowchart of a processing sequence of the communication startup processing system according to the third embodiment.

FIG. 7 is a flowchart of a processing sequence of the communication startup processing system according to the third embodiment. When the first personal computer 11a issues a circuit connection command in a step S41, the communication device 12b effects a circuit connection to connect to the access point on the Internet in a step S42. When the first personal computer 11a issues a connection request in a step S43, the communication device 12b transfers a message to the introduction processor 16 of the server 15 in a step S44, and the introduction processor 16 receives the connection request from the first personal computer 11a in a step S45. At this time, the message from the first personal computer 11a includes conditions for a party to be connected to, other than the connection request. After having transmitted the connection request, the first personal computer 11a issues a circuit disconnection command in a step S46, and the communication device 12a disconnects its circuit from the introduction processor 16 in a step S47. After the circuit is disconnected, the power supply of the first personal computer 11a may be turned off in a step S48. After having received the connection request from the first personal computer 11a, the introduction processor 16 registers the first personal computer 11a in the registering unit 17 in a step S49.

Then, the second personal computer 11b carries out a circuit connection to connect to the access point on the Internet 14 in a step S50, and transmits a connection request to the introduction processor 16 in a step S51. At this time, the second personal computer 11a simultaneously transmits conditions for a party to be connected to. After having received the connection request from the second personal computer 11b in a step S52, the introduction processor 16 searches the registering unit 17 for a personal computer which meets the conditions in a step S53. If there is no such personal computer, then the introduction processor 16 waits for a next connection request. If there is a personal computer which meets the conditions, then the introduction processor 16 regards the personal computer as a party to communicate with. It is assumed here that the conditions of the first and second personal computers 11a, 11b meet each other. When the conditions are met, the second personal computer 11b remains connected to the Internet 14, and waits for a reply from the party to communicate with or the introduction processor 16.

Then, the introduction processor 16 connects to the first personal computer 11a through the public circuit network 13. After having transmitted the connection request from the second personal computer 11b in a step S54, the introduction processor 16 disconnects its circuit from the public circuit network 13 in a step S55. At this time, the introduction processor 16 may simultaneously transmit the control information of the first personal computer 11a as well as the connection request from the second personal computer 11b, and also may simultaneously transmit the destination connection information such as the IP address of the second personal computer 11b.

The communication device 12a receives the information from the introduction processor 16 in a step S56. If the received information contains the control information of the first personal computer 11a, then the communication device 12a carries out a process according to the control information, i.e., issues a start command, in a step S57. At this time, the communication device 12a may turn on the power supply of the first personal computer 11a.

Based on the start command from the communication device 12a, the first personal computer 11a is turned on, if necessary, and starts an application in a step S58. Then, the communication device 12a transfers the control in formation to the first personal computer 11a in a step S59. The first personal computer 11a acquires the control information in a step S60. The control information includes a message relative to parameters of the application.

Based on the information transmitted from the introduction processor 16, the first personal computer 11a issues a circuit connection command in a step S61. In response to the circuit connection command, the communication device 12a connects to the access point on the Internet 14, connecting again to the introduction processor 16 in a step S62. Thereafter, the first personal computer 11a issues a connection request for connection to the second personal computer 11b in a step S63. The communication device 12a transfers the message of the connection request to the introduction processor 16 in a step S64.

Upon reception of the connection request for connection to the second personal computer 11b from the first personal computer 11a in a step S65, the introduction processor 16 connects the second personal computer 11b, which has remained connected to the Internet and waited after having issued the connection request, and the first personal computer 11a to each other for mutual communications therebetween in a step S66. The first personal computer 11a and the second personal computer 11b are now capable of mutual communications with each other. The mutual communications between the first personal computer 11a and the second personal computer 11b are carried out through the introduction processor 16. However, after the introduction processor 16 has transmitted IP addresses and port numbers of the first and second personal computers 11a, 11b to each other, mutual communications may be carried out directly between the first personal computer 11a and the second personal computer 11b.

Yet still another embodiment of the present invention which is applied to a communication startup process when control information is held by a personal computer will be described below.

Figure 8:
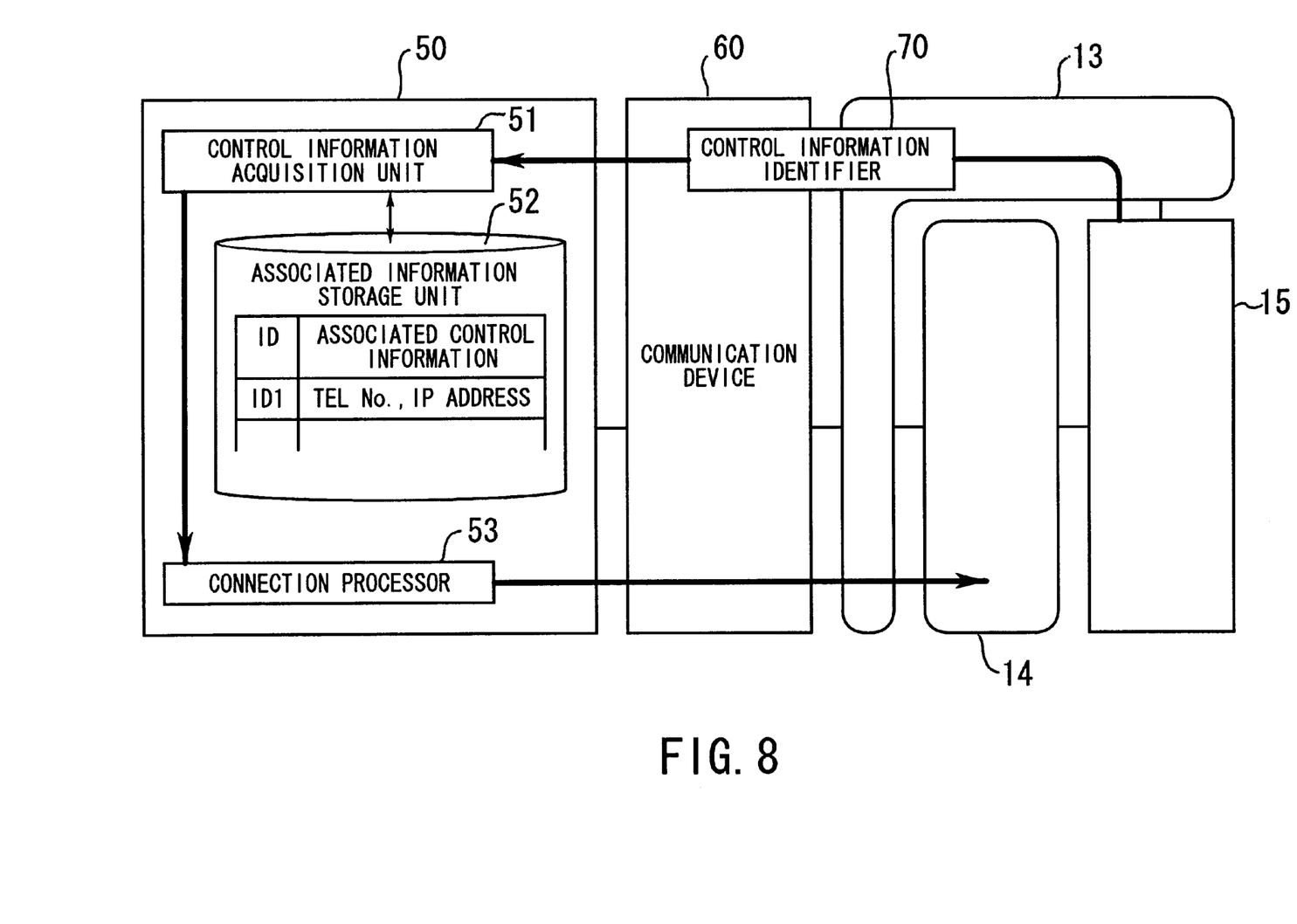
FIG. 8 is a block diagram showing an arrangement and an operation procedure of a communication startup processing system according to a fourth embodiment of the present invention.

FIG. 8 shows in block form an arrangement and an operation procedure of a communication startup processing system according to a fourth embodiment of the present invention. Those parts in FIG. 8 which are identical to those shown in FIG. 2 are indicated by identical reference numerals and representations and will not be described in detail below. As shown in FIG. 8, a personal computer 50 has a control information acquisition unit 51, an associated information storage unit 52 for storing a table of control information identifiers (ID) and control information associated therewith, and a connection processor 53, and is connected to a communication device 60.

When the control information acquisition unit 51 receives a control information identifier 70 as control information transmitted from another personal computer, it refers to the associated information storage unit 52 using the received control information identifier 70 as a key, and acquires the control information of the personal computer 50. The connection processor 53 makes a connection based on control information received from the control information acquisition unit 51.

In the first through third embodiments, information for controlling the first personal computer 11a is basically transmitted from another personal computer. According to the fourth embodiment, however, the control information of the personal computer 50 is stored in the associated information storage unit 52 of its own, and the personal computer 50 receives only the control information identifier 70 from another personal computer. Based on the received control information identifier 70, the personal computer 50 searches the associated information storage unit 52 for associated control information. Based on the acquired control information, the connection processor 53 carries out its own process to make a connection.

A communication startup process at the time a connection request is received from another device such as a personal computer or the introduction processor 16 of the server 15 will be described below.

Figure 9:
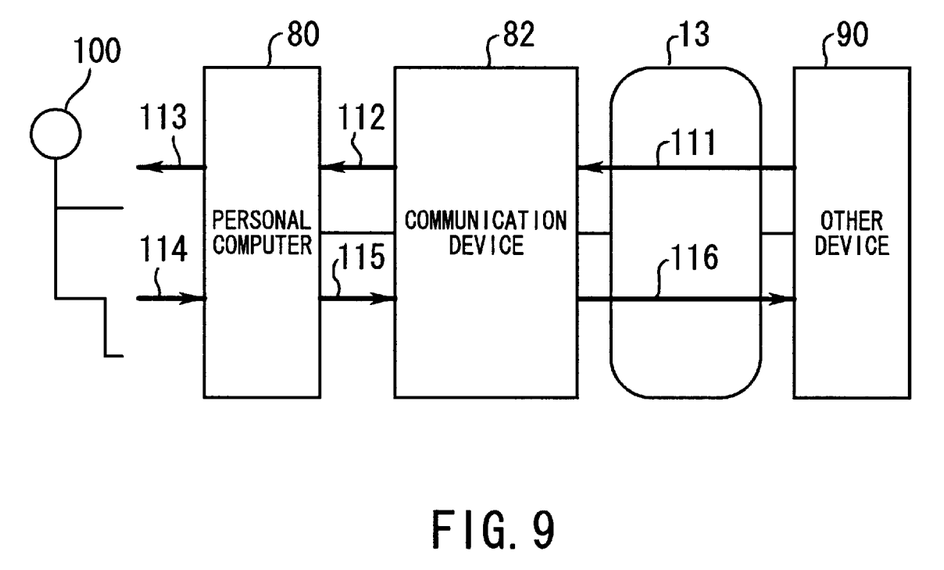
FIG. 9 is a block diagram illustrating an arrangement and an operation procedure at the time a connection request is transmitted.

FIG. 9 illustrates in block form an arrangement and an operation procedure at the time a connection request is transmitted. In FIG. 9, a personal computer 80 is connected to a communication device 82, which is connected through the public circuit network 13 to another device 90 such as a personal computer or the introduction processor 16 of the server 15.

A process of connecting a circuit in response to a call from the other device 90 will be described below. The other device 90 transmits a call signal as indicated by the arrow 111. When the transmitted call signal is received by the communication device 82, the communication device 82 sends a start/call notice to the personal computer 80 as indicated by the arrow 112. In response to the start/call notice, the personal computer 80 starts a predetermined application, and then issues a call sound as indicated by the arrow 113. In response to the call sound, the operator 100 of the personal computer 80 enters a connection command into the personal computer 80 as indicated by the arrow 114. In response to the connection command, the personal computer 80 sends a connection command to the communication device 82 as indicated by the arrow 115. The communication device 82 makes a circuit connection to connect to the other device 90 as indicated by the arrow 116.

A communication startup process at the time a connection request is received from the other device will be described in detail below.

Figure 10:
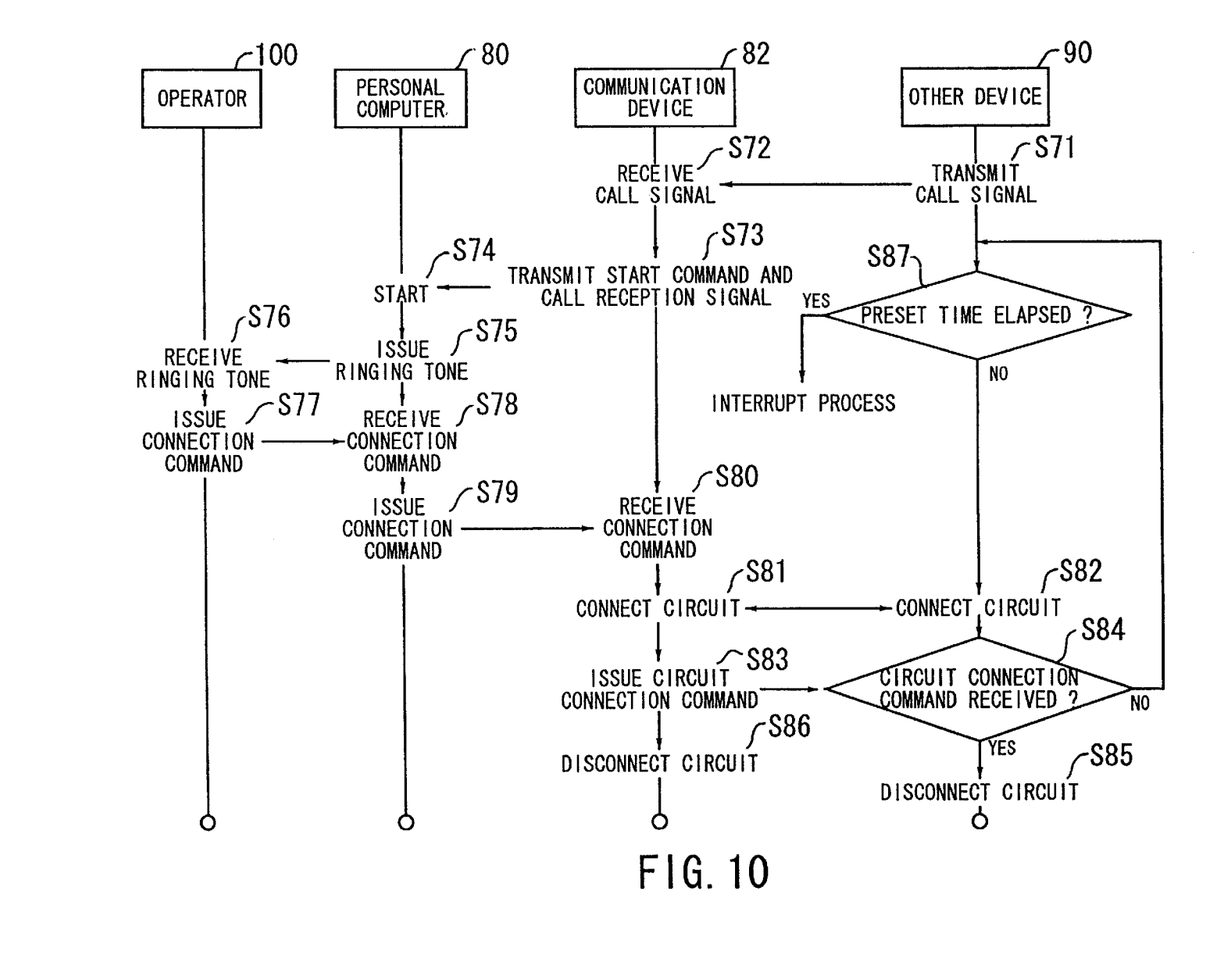
FIG. 10 is a flowchart of a processing sequence at the time a connection request from another device is received.

FIG. 10 is a flowchart of a processing sequence at the time a connection request from the other device is received. First, the other device 90 transmits a call signal (on a telephone circuit, the other device 90 dials the telephone number of the communication device 82) in a step S71. When the communication device 82 receives the call signal from the other device 90 (on a telephone circuit, a ringing tone from the other device 90) in a step S72, the communication device 82 transmits a start command and a call reception signal to the personal computer 80 in a step S73. Before establishing a circuit connection (on a telephone circuit, an off-hook condition for conversation), the communication device 82 waits for a command for a circuit connection from the personal computer 80.

In response to the start command and the call reception signal from the communication device 82, the personal computer 80 starts an application for making a connection in a step S74, and then generates a ringing tone in a step S75. The ringing tone is generated through a built-in speaker of the personal computer 80 or an external speaker connected to the personal computer 80. The operator 100 of the personal computer 80 now recognizes that an incoming call has arrived based on the ringing tone in a step S76. Thereafter, the operator 100 enters a keyboard input or the like to apply a circuit connection command in a step S77. In response to the circuit connection command in a step S78, the personal computer 80 transmits the circuit connection command to the communication device 82 in a step S79. When the communication device 82 receives the circuit connection command from the personal computer 80 in a step S80, the communication device 82 carries out a circuit connection, connecting its circuit to the other device 90 in steps S81, S82. When the communication device 82 issues a circuit connection command in a step S83, the other device 90 checks if the circuit connection command is received or not in a step S84. If the circuit connection command from the communication device 82 is received, the other device 90 disconnects its circuit from the communication device 82 in steps S85, S86, and prepares itself for a circuit connection from the personal computer 80.

After having transmitted the call signal, the other device 90 checks the time that has elapsed in a step S87. If no circuit connection is achieved within a preset period of time after the transmission of the call signal, the other device 90 interrupts the communication startup process.

According to a further embodiment of the present invention, a personal computer and a communication device may be combined with each other. Specifically, while the personal computer and the communication device have been illustrated as separate from each other in the above embodiments, they may be united into a unitary structure for carrying out a communication startup process.

According to the present invention, as described above, for starting mutual communications between at least two user terminals, one of the user terminals receives a connection request from the other user terminal through a public circuit network, and thereafter disconnects its circuit. Then, the user terminal connects again a nearby access point to establish a connection between the user terminals on the Internet. Therefore, it is possible to carry out mutual communications between the user terminals through the Internet while the user terminals are being connected to respective nearby access points on the Internet. As a result, the expenses of mutual communications can be equalized between the user terminals.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication startup processing system for starting mutual communications between at least two user terminals through a communication path established via a packet switching network using a public circuit, comprising:

a connection device at each of the user terminals making a connection required for mutual communications with another user terminal;

a communication processor, connected between each of the user terminals and the public circuit and responsive to a control message from another user terminal, starting said connection device according to control information included in said control message, and connecting again to a user terminal which has issued a connection request through the communication path from the public circuit via the packet switching network, based on destination information included in said control message as to a user terminal to be connected to; and an introduction processor, connected to said public circuit and said communication path and responsive to a connection request from another user terminal through said communication path, transmitting a control message including control information and destination information of the other user terminal, to said communication processor of the user terminal indicated by said connection request so that a connection is set up between two users via the Internet, so that each user is responsible for paying access charges to its own network service provider.

2. A communication startup processing system according to claim 1, wherein said communication processor comprises a power supply energizer energizing a power supply of the user terminals based on the control information included in said control message.

3. A communication startup processing system according to claim 1, wherein said communication processor comprises means for transmitting a connection request to said introduction processing means based on the destination information when the destination information is received from said other user terminal through said public circuit.

4. A communication startup processing system according to claim 1, wherein said introduction processor comprises means for receiving and registering connection requests transmitted from the user terminals through the communication path via the packet switching network, and transmitting the control information and the destination information of another user terminal through the public circuit to said communication processor of a user terminal which has been registered, based on the connection request from the other user terminal which has been received through said communication path.

5. A communication startup processing system according to claim 1, wherein said connection request includes conditions for the user terminal to communicate with, and the control information and the destination information are transmitted to only a user terminal which meets said conditions.

6. A communication startup processing system according to claim 1, wherein said connection processor has associated information storage storing an associated relationship between control information identifiers and control information, and means responsive to the control message from the other user terminal, for referring to said associated information storage based on a control information identifier included in said control message, to acquire control information required to connect to the other user terminal.

7. A communication processing apparatus for use in a communication startup processing system connected between user terminals and a public circuit, for starting mutual communications between at least two user terminals through a communication path established via a a network service provider apparatus using the public circuit, comprising:

a communication processing device responsive to a request, received through the public circuit, to establish the communication path via the network service provider apparatus, starting a connection processing device of a user terminal connected thereto and establishing the communication path via the Internet, so that each user is responsible for paying access charges to its own network service provider.

8. A communication processing apparatus according to claim 7, wherein said communication processing device comprises receiving means for receiving an information notice representative of destination information as to a user terminal to be connected to and control information from another user terminal, transmitting means responsive to the information notice for connecting again to a user terminal which has issued a connection request through the communication path indicated by said destination information, and starting means for starting the connection processing means of the user terminal according to said control information.

9. A communication processing apparatus according to claim 8, wherein said communication processing means further comprises power supply energizing means for energizing a power supply of the user terminals based on said control information.

10. A method of starting a communication process to start mutual communications between at least two user terminals through a communication path established via a network service provider apparatus using a public circuit, comprising the steps of:

acquiring, by a first user terminal, control information from a connection request by receiving the connection request from a second user terminal through the public circuit;

starting a connection processing device of said first user terminal with the acquired control information;

establishing, by said second user terminal, a communication path through the introduction processor via the network service provider apparatus using the public circuit after the second user terminal has transmitted a connection request; and establishing, by said first user terminal, a communication path via the Internet using the public circuit based on said control information, and connecting the first user terminal to said second user terminal through the communication path, and so that each user is responsible for paying access charges to its own network service provider.

11. A method according to claim 10, wherein after said second user terminal has transmitted the connection request for said first user terminal to the introduction processor through the communication path, said second user terminal remains connected to said communication path.

12. A method according to claim 10, wherein after said second user terminal has transmitted the connection request for said first user terminal directly to said first user terminal through said public circuit, said second user terminal connects again the communication path via said circuit relay apparatus.

13. A computer readable storage medium storing a process controlling a computer of making a connection required for mutual communications with a user terminal to communicate with, and starting a connection processing device according to control information included in said control message and connecting again to a user terminal which has issued a connection request and which is indicated by destination information included in said control message so that a connection occurs via the Internet between users, and so that each user is responsible for paying access charges to its own network service provider.

14. A computer readable storage medium storing a process controlling a computer of receiving a control message representative of a connection request from another user terminal, connecting again, in response to said control message, to a user terminal which has issued a connection request and which is indicated by destination information included in said control message, starting a connection processor of a user terminal according to control information included in said control message, and energizing a power supply of the user terminal based on said control information, so that a connection is established between users via the Internet, and so that each user is responsible for paying access charges to its own network service provider.

15. A computer readable storage medium storing a process controlling a computer in response to a connection request from a user terminal through a communication path via a network service provider apparatus using a public circuit, of transmitting control information and destination information to a user terminal to be connected to through said public circuit to another user terminal, and connecting said user terminal and said other user terminal to each other through said communication path via the Internet, and so that each user is responsible for paying access charges to its own network service provider.

* * * * *